Nov. 9, 1965  H. D. HINNAH  3,217,144
INDICATOR SYSTEMS
Filed Aug. 6, 1962  2 Sheets-Sheet 1
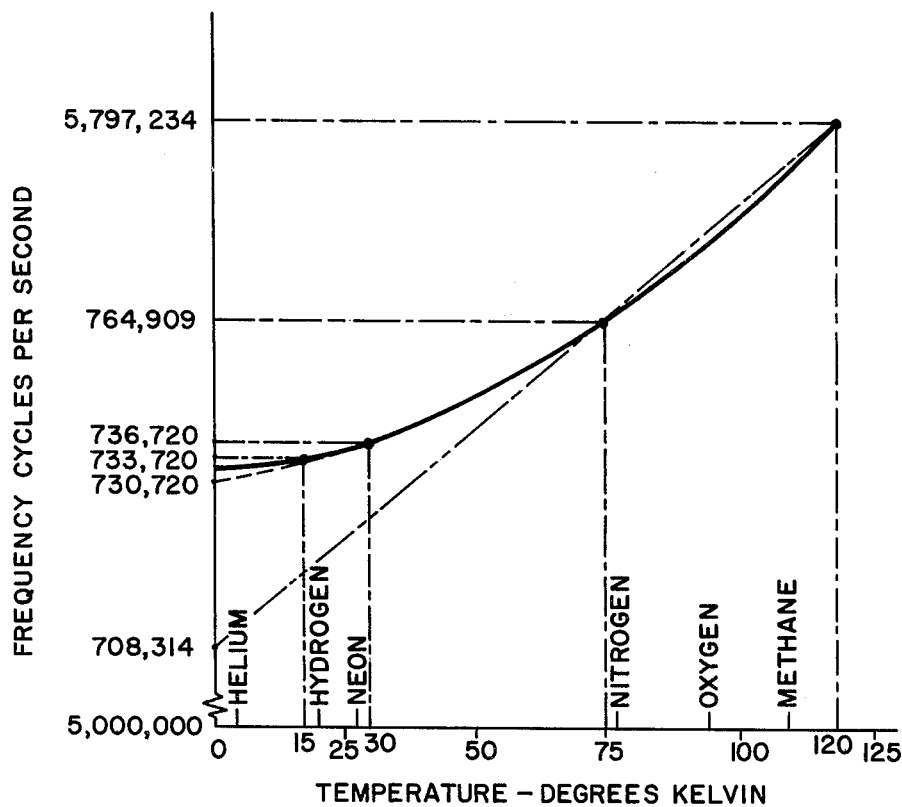
FIG. I
INVENTOR
HOWARD D. HINNAH
BY
*Grover C. Frater*
ATTORNEY

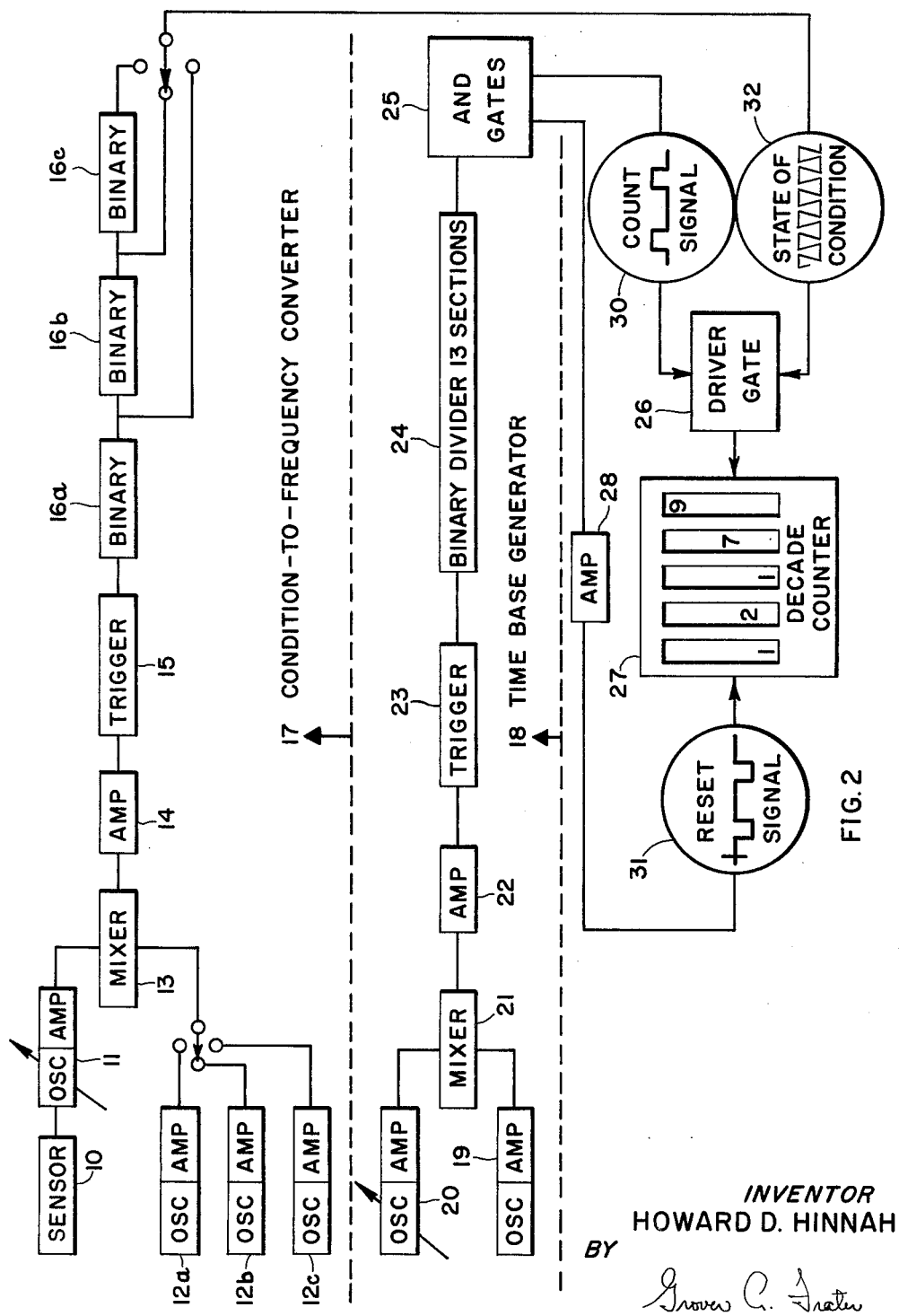

United States Patent Office 3,217,144
Patented Nov. 9, 1965

3,217,144
INDICATOR SYSTEMS
Howard D. Hinnah, Davenport, Iowa, assignor to The Bendix Corporation, Davenport, Iowa, a corporation of Delaware
Filed Aug. 6, 1962, Ser. No. 214,927
5 Claims. (Cl. 235—92)

This invention relates to improvements in digital indicator systems.

It is often desired to provide a digital signal which represents the state of a condition in terms of a reference state. This invention can provide such signals and it can provide them in cases in which the reference state lies outside, or at one end of, the range of states to be indicated. In cases wherein the relation between the state of the condition and transducer output is not linear, and in cases in which it is required to alter the scale factor in which the state of the condition is indicated.

Use of the invention is especially advantageous in the digital indication of cryogenic temperatures and this application has inherent in it many of the problems that are solved by the invention. Accordingly, the embodiment selected for illustration relates to cryogenic temperature indication. It is to be understood, however, that the invention has general application and that other embodiments of the invention are possible, and that various modifications may be made in the embodiment shown, without departing from the spirit of the invention or the scope of the appended claims.

In the drawing:

FIG. 1 is a graph of the relation between temperature and the frequency of an oscillator; and FIG. 2 is a block diagram of a temperature sensor and digital readout system embodying the invention.

Means are provided in the invention for developing an electrical signal whose frequency varies as a function of the state of the condition to be measured. Advantageously, as in the embodiment selected for illustration wherein the condition to be measured is temperature, this means comprises an electronic oscillator whose frequency varies with the temperature of its crystal, the latter being subjected to the temperature sought to be measured. A representative relation between oscillator frequency and temperature is shown in FIG. 1 for temperature in the range from zero to 125 degrees Kelvin. The relation is non-linear. It is an actual curve, selected, rather than a linear one, to permit description of the invention in a more general case. These cryogenic temperatures are difficult to attain in practice except by liquefying gases. Accordingly, temperatures near the boiling points of helium, hydrogen, and neon, and temperatures near the boiling points of some others in the 75 to 120 degree Kelvin range such as nitrogen and oxygen, are of most interest. On this basis it might be decided, by way of example, that the indicator will provide indications of temperature over three ranges—75 to 120 degrees Kelvin, 15 to 30 degrees Kelvin, and a third range, too small to be shown in FIG. 1, in the region of 4.2 degrees Kelvin. Examination of FIG. 1 shows that the average slope of the frequency-temperature curve is about 741 cycles per second per degree Kelvin in the 75 to 120 degree range and is about 200 cycles per second per degree Kelvin in the 15 to 30 degree range. The slope in the 4.2 degree range is too small for measurement on FIG. 1, but is about 60 cycles per second per degree Kelvin. Within these ranges the frequency vs. temperature curve is treated as being linear.

Turning to the block diagram of FIG. 2, there is shown a condition sensor 10, an electronic oscillator and isolation amplifier 11 whose frequency is varied with the state of said condition, several fixed frequency oscillators and isolation amplifiers 12a, 12b, and 12c, and a mixer 13 to which oscillator 11 and a selected one of the oscillators 12 are connected. The mixer is followed by an isolation amplifier 14, having selectivity to reject all of the mixer products except the lower sideband, a Schmidt trigger 15, a number of binary frequency dividers 16a, 16b, 16c. The apparatus thus far described constitutes a condition-to-frequency converter numbered 17. Its output, in the embodiment shown, in a square wave whose frequency is indicative of the state of the condition being sensed. The numeral 18 designates an adjustable time base generator. It comprises a fixed frequency oscillator and isolation amplifier 20. Outputs of these oscillators are heterodyned or combined in a mixer 21 and the mixer products are applied to an isolation amplifier 22 which is frequency selective so that it will pass only the lower sideband. Amplifier 22 is followed by a Schmidt trigger 23 and a series of binary dividers 24 (11 sections in this embodiment) which are, in turn, followed by a pair of "AND" gates 25. The output of time base generator 18 is a "count" pulse and a "reset" pulse.

The square wave output of the condition-to-frequency converter and the "count" pulse from the time base generator are both applied to a combined driver and a gate unit 25. The output of the latter is applied to a decade counter 27. The "reset" pulse output of the time base converter is applied through a reset amplifier 28 to the decade counter 27.

Relating FIGS. 1 and 2, the combination of the sensor 10 and oscillator-amplifier 11 apply a sinusoidal electrical signal to the mixer 13. The frequency of that electrical signal is a function, in this embodiment, of temperature as shown by the curve of FIG. 1. The relation between the state of the condition, here temperature, and frequency is considered in the invention to be linear within the limits of required readout accuracy. When this is not true, as in this embodiment, the range of the instrument must be limited to a segment of the curve that can be considered to be linear. In FIG. 1, three such ranges have been designated. The first, not diagrammed, is in the region of 4.2 degrees Kelvin. The second extends from 15 through 30 degrees Kelvin, and the third extends from 75 through 120 degrees Kelvin.

Oscillator-amplifiers 12a, 12b, and 12c are used, one at a time, when it is desired to provide a digital signal indication of temperature, in the first, second, and third ranges, respectively. The frequency of these oscillators may be selected as follows. First a reference temperature and temperature scale are selected. Then the frequency output of sensor 10-oscillator 11 combination is plotted against temperature on the reference scale in which the reference temperature is at the origin. Then the range to be indicated is marked off on the graph by marking the low and high temperature points on the curve. Next a straight line is drawn through those points and is extended to intersect the frequency axis at the reference temperature. The frequency intercept at the reference temperature is selected as the frequency of the fixed frequency oscillator.

Stated another way, the frequency of the fixed oscillator 12 is selected as the value, at said reference state, of a second function which is both linear and coincident with the average slope of the function represented by FIG. 1 over a selected range.

In this embodiment the Kelvin scale has been selected as the reference scale and the reference temperature is zero degrees Kelvin. A straight line drawn through the 120 and 75 degree points on the curve, intersects the frequency axis at 5,708,314 c.p.s so oscillator 12c is made to operate at this frequency. Similarly, oscillator 12b operates at 5,730,720 c.p.s. and oscillator 12a operates at about 5,732,000 c.p.s. The output of the oscillator for a selected one of the three ranges is applied to mixer 13. The following isolation amplifier 14 rejects all mixer outputs except the lower sideband whereby the output of the isolation amplifier is a sine wave whose frequency varies as a function of temperature on a frequency-temperature scale having its origin at zero frequency for zero degrees Kelvin. Thus with oscillator 12c in operation, the isolation amplifier 14 output varies from 56,595, c.p.s. at 75 degrees Kelvin to 88,920 c.p.s. at 120 degrees Kelvin. Thus frequency changes by 741 c.p.s. per degree Kelvin.

In the middle range, the isolation amplifier output is 3000 c.p.s. at 15 degrees Kelvin and 6,000 c.p.s. at 30 degrees Kelvin so it changes 200 c.p.s. per degree K.

The output of the isolation amplifier is a sine wave. Square wave pulses are more readily counted, so advantageously, as shown, the sine wave is converted to a square wave by any convenient means such as a Schmidt trigger shown. The result is a square wave whose frequency varies with the state of the condition.

When oscillator 12c is in operation the circuit, the Schmidt trigger output varies from 56,595 c.p.s., at 75 degrees Kelvin, to 88,920 c.p.s. at 120 degrees Kelvin. This is a frequency change of 741 c.p.s. per degree Kelvin.

In the middle range, when oscillator 12b is in operation, the Schmidt trigger output is 3,000 c.p.s. at 15 degrees Kelvin and 6,000 c.p.s. at 30 degrees, so the change is 200 c.p.s. per degree Kelvin.

In the lower range the frequency change is about 60 c.p.s. per degree Kelvin.

The digital output signal is provided by counting pulses but the pulse rates 741, 400, and 60 c.p.s. per degree are not suitable in themselves for providing digital signals in a decade numbering system. Accordingly, means are provided in the invention for changing the scale of the relation between pulses and time. Two such means are shown in the embodiment illustrated. The first of these means provides a signal whose frequency is an integral multiple of the frequency of the lower side band. In the embodiment shown this first means comprises binary dividers. The second of these means comprises a time base generator which permits altering the period over which pulses are counted.

The scale is changed such that the state of the condition is represented as a selected power of ten times the selected unit of measurement. In the case of the system shown in the drawing the state is indicated in units of $10^2$ times degrees Kelvin which means that each cycle counted by the counter represents one one-hundredth of a degree Kelvin.

In the embodiment shown only the single binary divider 16a would be employed in the middle range whereby its output, and the output of the condition-to-frequency converter 17, would be a square wave having a frequency of $15 \times 100$ plus one c.p.s. for each one-hundredth of one Kelvin degree temperature greater than 15 degrees Kelvin up to 30 degrees Kelvin.

In the embodiment shown all three of the binary dividers 16a, 16b, and 16c would be included in the circuit while measuring temperature in the 75 to 120 degree K range. Accordingly, the mixer output would be divided by eight and the condition-to-frequency converter 17 output would vary 92.625 c.p.s. per degree Kelvin.

It is obvious that the output of converter 17 is very convenient in the middle temperature range for indicating temperatures digitally in hundredths of degrees Kelvin. It is also apparent that the output of converter 17 is not convenient in the high temperature range for digital indication. The difficulty is overcome by the use of a time base generator such, for example, as generator 18 whose elements have been described. The two oscillator-amplifier units 19 and 20 have base oscillation frequencies about 1024 cycles apart so that the output of the twelfth binary divider has a base frequency of one-half cycle per second and the thirteenth has a frequency of one-fourth c.p.s. Comparison of the twelfth and thirteenth binary output in the "AND" gates 25 results in count and reset signal wave shapes like those shown in FIG. 2 at 30 and 31 respectively.

In view of the count and reset signals 30 and 31, the state-of-condition pulse train is applied through the driver-gate to the decade counter for a period of one second. The number of pulses reaching the counter in that second is displayed on the counter for the next two seconds. Finally, the counter is reset in the fourth second after which the readout cycle is repeated.

Thus with the intermediate temperature range, fixed frequency oscillator 12b in the converter circuit and assuming that the frequency difference between oscillators 19 and 20 is 1024 c.p.s., counter 27 will indicate temperature in the range 15 to 30 degrees Kelvin directly in hundredths of degrees.

If the converter 17 is operated in the high temperature range by connecting oscillator 12c to mixer 13, then the number of pulses arriving at the counter per second is 92.625 pulses for each degree Kelvin of temperature. If the count signal 30 period was slightly longer than one second in duration, then in one counting period a number of square wave pulses equal to 100 times the temperature in degrees Kelvin would be applied to the counter and counted whereby temperature would again be indicated in hundredths of degrees Kelvin. The counting period would be to one second as 100,000 counts is to 92.625 counts. Thus the counting period would be approximately 1.08 seconds. Remembering that there are 13 sections in the binary counter 24, this counting period is accomplished by adjusting the frequency of adjustable frequency oscillator 20 such that it differs by 1106 c.p.s. from oscillator 19 frequency.

Thus the indicator system comprises:

A condition sensor or transducer whose output is frequency, and

Means for generating a reference signal the frequency of which is the frequency said sensor output would have at a selected reference condition if the condition-to-frequency transfer characteristic of the sensor was linear and had as its slope the average slope exhibited by it over a selected range of said condition, and Means for mixing the sensor output and said reference signal, and Means sensitive only to the lower sideband among the mixer products.

The lower sideband frequency comprises a digital signal in which zero frequency means zero value or state of the condition. The scale may or may not be representable in the decimal number system. If not, the indicator system comprises means for altering the time base for frequency measurement. This means comprises the time base generator per se and the binary dividers of the condition-to-frequency converter or either of them.

All of the elements represented by the boxes of FIG. 2 are conventional commonly known units except the combination of the sensor 10 and oscillator amplifier 11. In the preferred embodiment, even this is a conventional crystal oscillator with the single exception that the crystal is separated physically from the remainder of the oscillator and is separately housed to permit its being subjected separately to the temperature being measured.

I claim:

1. Means for producing a digital signal indicative of the state of a condition, relative to a reference state comprising, (a) a variable frequency oscillator sensitive to said condition to oscillate at frequencies indicative of the state of said condition including a first frequency when said condition is at one extreme state in said range and a second frequency when said condition is at the other extreme state in the range, (b) a fixed frequency oscillator whose frequency is fixed such that the difference between said first and second frequencies is to the difference between the frequency of said fixed frequency oscillator and said second frequency as the difference between said first and second states of said condition is to the difference between said reference state and said second state of said condition, (c) mixer means for combining the oscillatory signals of said first and variable frequency oscillators, (d) and readout means sensitive to the frequency of the lower side band generated by said mixer means.

2. A digital signal indicating system comprising:
(a) means sensitive to a condition for providing a first alternating electrical signal whose frequency varies as a first function of the state of said condition such that said function has an average slope over a selected range of states.
(b) means for providing a second alternating electrical signal whose frequency is fixed at a value corresponding to the value at a reference state of a second function which is linear and coincident over said range of states with said average slope of said first function,
(c) means for heterodyning said first and second signals,
(d) and means connected to said means for heterodyning for providing a digital signal corresponding to the frequency of the lower sideband produced by said means for heterodyning.

3. A digital signal indicating system comprising:
(a) means sensitive to a condition for providing a first alternating electrical signal whose frequency varies as a first function of the state of said condition such that said function has an average slope over a selected range of states,
(b) means for providing a second alternating electrical signal whose frequency is fixed at a value corresponding to the value at a reference state of a second function which is linear and coincident over said range of states with said average slope of said first function,
(c) means for heterodyning said first and second signals,
(d) and readout means for providing a digital signal corresponding to the state of said condition including means for counting alternations of the lower side band produced by said means for heterodyning and means for controlling the period over which said alternations are counted.

4. A digital signal indicating system for representing as a power of ten times a predetermined unit of measure, the state of a condition relative to a selected reference state, comprising:
(a) means sensitive to said condition for providing a first alternating electrical signal whose frequency varies as a first function of the state of said condition such that said function has an average slope over a selected range of states,
(b) means for providing a second electrical signal whose frequency is fixed at a value corresponding to the value, at said reference state, of a second function relating frequency and the state of said condition and which second function is linear and coincident with said average slope of said first function,
(c) means comprising a mixer for heterodyning said first and second signals and producing mixer products comprising a lower sideband, and
(d) readout means connected to said mixer for representing the state of said condition as a selected power of ten times a given unit of measure including frequency counting means and a scale changer, said scale changer including at least one of means for applying to said counting means signals whose frequency is an integral multiple of the frequency of said lower sideband and means for altering the period over which said counting means is effective to count.

5. A digital readout temperature indicating system comprising:
(a) means sensitive to temperature for providing a first alternating electrical signal whose frequency varies as a function of temperature such that the function has an average slope over each of a plurality of selected ranges of temperatures,
(b) means for providing a second electrical signal having one of a plurality of fixed frequencies corresponding respectively to said ranges such that the frequency of the recond signal corresponds to the frequency intercept of a line drawn coincident with the average slope of said function of temperature over the corresponding one of said ranges,
(c) means for heterodyning said first and second signals to provide a third signal having the frequency of their difference, and
(d) counting means for counting signal pulses corresponding to pulses of said third signal, and
(e) means for controlling the duration of the time over which said counting means is effective to count signal pulses.

References Cited by the Examiner
UNITED STATES PATENTS 2,828,468 3/58 Ball et al. _____ 324—78
2,835,868 5/58 Lindesmith _____ 324—111

OTHER REFERENCES

Pages 189–191, June 1954, "Frequency Meter Uses Digital Counters," by Roff, from "Electronics."

MALCOLM A. MORRISON, *Primary Examiner.*

UNITED STATES PATENT OFFICE
CERTIFICATE OF CORRECTION

Patent No. 3,217,144                                                  November 9, 1965

Howard D. Hinnah

It is hereby certified that error appears in the above numbered patent requiring correction and that the said Letters Patent should read as corrected below.

Column 2, line 14, strike out "isolation amplifier 20. Outputs of these oscillators are" and insert instead -- isolation amplifier 19, an adjustable frequency oscillator and isolation amplifier 20. Outputs of these oscillators are --; column 6, line 33, for "recond" read -- second --.

Signed and sealed this 13th day of September 1966.

(SEAL)
Attest:

ERNEST W. SWIDER
Attesting Officer

EDWARD J. BRENNER
Commissioner of Patents